US006839517B2

(12) United States Patent
Anigbo et al.

(10) Patent No.: US 6,839,517 B2
(45) Date of Patent: Jan. 4, 2005

(54) APPARATUS AND METHOD FOR TRANSMITTING OPTICAL SIGNALS THROUGH A SINGLE FIBER OPTICAL NETWORK

(75) Inventors: Felix C. Anigbo, Trexlertown, PA (US); Gerard Edmond Henein, Chatham, NJ (US); Anpei Pan, Easton, PA (US); Moon Soo Park, Huntington Beach, CA (US); Yong-Kwan Park, Wescosville, PA (US); John D. Weld, Ledgewood, NJ (US)

(73) Assignees: Agere Systems Inc., Allentown, PA (US); Triquint Technology Holding Co., Hillsboro, OR (US)

( * ) Notice: Subject to any disclaimer, the term of this patent is extended or adjusted under 35 U.S.C. 154(b) by 664 days.

(21) Appl. No.: 09/781,571

(22) Filed: Feb. 12, 2001

(65) Prior Publication Data

US 2002/0110313 A1 Aug. 15, 2002

(51) Int. Cl.$^7$ .......................... H04J 14/02; H04B 10/24
(52) U.S. Cl. ............................ 398/85; 398/42
(58) Field of Search .................... 398/85, 42, 138, 398/139; 359/589

(56) References Cited

U.S. PATENT DOCUMENTS

| 5,452,124 | A | * | 9/1995 | Baker ..................... 359/341.2 |
| 5,481,634 | A | * | 1/1996 | Anderson et al. ............. 385/76 |
| 5,786,915 | A | * | 7/1998 | Scobey ........................ 398/82 |
| 5,790,314 | A | * | 8/1998 | Duck et al. ................. 359/654 |
| 5,801,879 | A | * | 9/1998 | Burton et al. ............ 359/341.2 |
| 6,078,709 | A | | 6/2000 | Abramov et al. ............. 385/37 |
| 6,148,124 | A | | 11/2000 | Aksyuk et al. ............... 385/24 |
| 6,175,432 | B1 | | 1/2001 | Wu et al. .................... 359/124 |
| 6,198,556 | B1 | | 3/2001 | Mizrahi ...................... 359/124 |
| 6,198,857 | B1 | * | 3/2001 | Grasis et al. ................. 385/24 |
| 6,204,946 | B1 | | 3/2001 | Aksyuk et al. ............. 359/131 |
| 6,208,440 | B1 | | 3/2001 | Jang ........................... 359/127 |
| 6,211,980 | B1 | | 4/2001 | Terahara .................... 359/128 |
| 6,212,312 | B1 | | 4/2001 | Grann et al. .................. 385/24 |
| 6,515,776 | B1 | * | 2/2003 | Naganuma ................... 398/82 |
| 6,524,016 | B1 | * | 2/2003 | Ohki et al. ................... 385/88 |

* cited by examiner

*Primary Examiner*—Jason Chan
*Assistant Examiner*—Shi K. Li

(57) ABSTRACT

An apparatus for wavelength multiplexing optical signals, wherein the apparatus includes at least one optically conductive sleeve, at least one collimating lens positioned to receive a optical signal from the at least one sleeve, and at least one dichroic splitter positioned to receive the optical signal from the at least one collimating lens. A filter may further be positioned to receive the optical signal from the at least one dichroic splitter in order to further filter the optical signal. The apparatus for wavelength multiplexing is configured to provide optical isolation of at least 75 dB via the combination of the at least one dichroic splitter and filter elements.

13 Claims, 10 Drawing Sheets

APPARATUS AND METHOD FOR TRANSMITTING OPTICAL SIGNALS THROUGH A SINGLE FIBER OPTICAL NETWORK

BACKGROUND OF THE INVENTION

1. Field of the Invention

The present invention relates to an apparatus and method for transmitting bi-directional optical signals over a single shared optical transmission medium. More particularly, the present invention relates to a novel wavelength division multiplexer (WDM) that facilitates transmission of bi-directional optical signals over a single shared optical transmission medium.

2. Background of the Related Art

Figure 1:
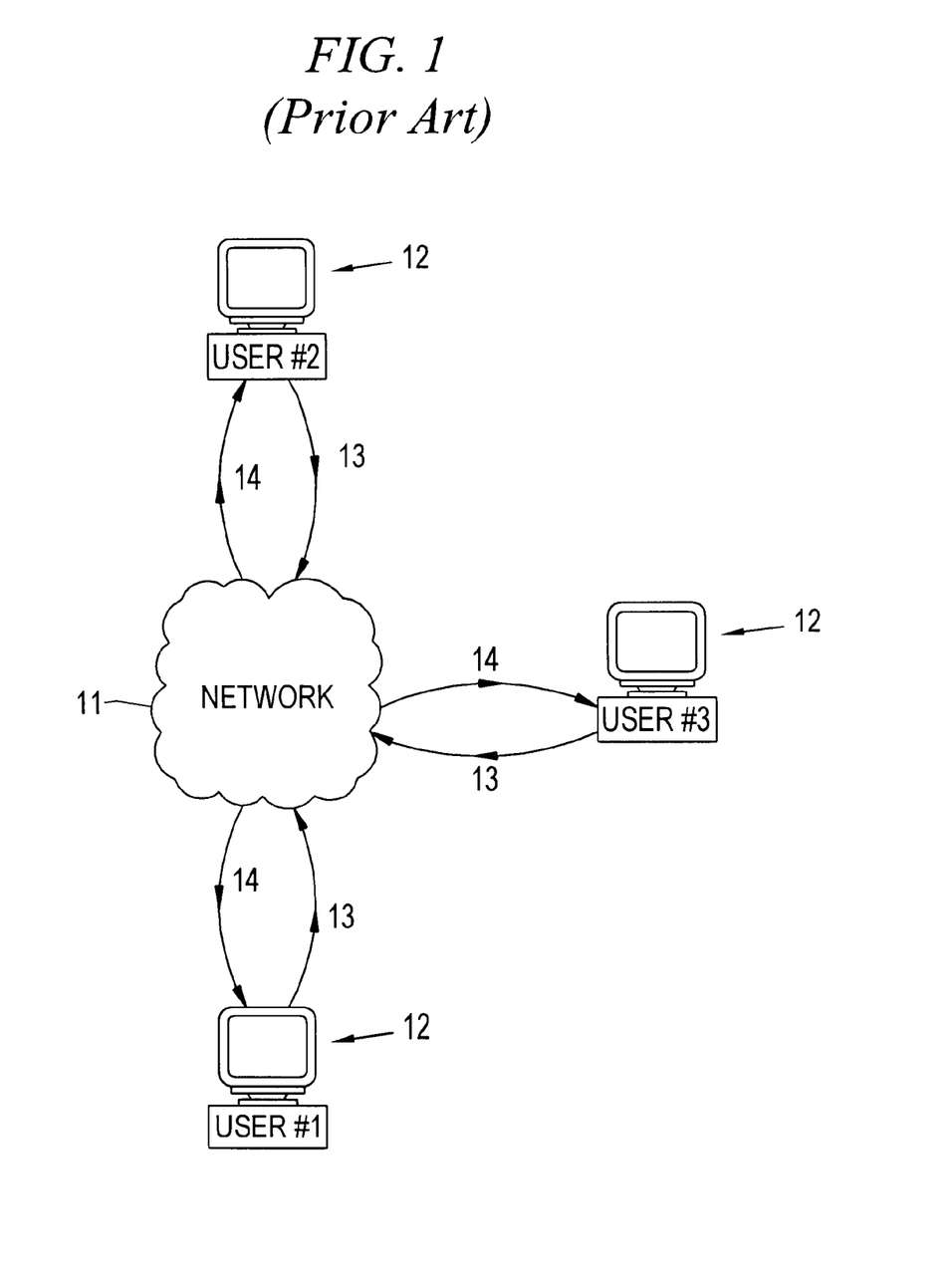
FIG. 1 illustrates an exemplary configuration of a conventional optical network.

Current optical based network systems generally utilize a pair of optical fibers to transmit and receive information from each individual end user station on the optical network. FIG. 1 illustrates an exemplary configuration of an optical based network system, wherein a central network device 11 is in communication with a plurality of end users 12 through individual optical fibers 13 and 14. Upstream optical fibers 13 operate to transmit optical information from end users 12 to network 11, while downstream optical fibers 14 operate to transmit optical information from network 11 to end user 12. Therefore, optical fibers 13 and 14 individually operate to transmit optical information in their respective directions, as indicated by the arrows in optical fibers 13 and 14 in FIG. 1. Although this type of optical network is generally successful in transmitting optical signals at relatively high throughput rates, this configuration suffers from the disadvantage of requiring a substantial supporting infrastructure, as a pair of optical fibers must be routed to each end user 12 in order to allow for bi-directional communication.

Therefore, in view of the clear disadvantages in present optical networking systems, there exists a need for an optically efficient and cost effective apparatus and method for transmitting bi-directional optical signals over a single shared optical transmission medium.

SUMMARY OF THE INVENTION

The present invention provides an apparatus for wavelength multiplexing optical signals, wherein the apparatus includes at least one optically conductive sleeve, at least one collimating lens positioned to receive a optical signal from the at least one sleeve, and at least one dichroic splitter positioned to receive the optical signal from the at least one collimating lens. A filter may further be positioned to receive the optical signal from the at least one dichroic splitter in order to further filter the optical signal. The apparatus for wavelength multiplexing is configured to provide optical isolation of at least 75 dB via the combination of the at least one dichroic splitter and filter elements.

The present invention further provides a wavelength division multiplexer having a first optically conductive sleeve and a first collimating lens positioned at a working distance from the first optically conductive sleeve, wherein the first collimating lens is configured to collimate a downstream optical signal into a first signal path. A first dichroic splitter positioned in the first signal path is included, wherein the first dichroic splitter is configured to reflect the downstream optical signal having a first wavelength into a second signal path with a first side of the first dichroic splitter. A second dichroic splitter is provided and positioned in the second signal path, the second dichroic splitter being configured to reflect the downstream optical signal having the first wavelength into a third signal path. A second collimating lens is positioned in the third signal path, the second collimating lens being configured to collimate the downstream optical signal traveling in the third signal path. A second optically conductive sleeve is positioned to receive the collimated downstream optical signal, and a third collimating lens is provided for transmitting an upstream optical signal to a second side of the first dichroic splitter. A third optically conductive sleeve is provided for receiving the upstream optical signal from an external component and transmitting the upstream optical signal to the third collimating lens. In this embodiment, the combination of first dichroic splitter and second dichroic splitter is configured to provide an optical isolation of at least 50 dB.

The present invention further provides a method for transmitting optical signals between a first and second locations on an optical network, wherein the method includes the steps of receiving an upstream optical signal from the first location in a first wavelength division multiplexer for transmission to the second location and transmitting the upstream optical signal across a single bi-directional optical fiber to a second wavelength division multiplexer proximate the second location. A filtering step is included for filtering the upstream optical signal in the second wavelength division multiplexer, and a transmitting step is included for transmitting the filtered upstream optical signal to the second location.

The present invention further provides an apparatus for transmitting optical signals between a first and second locations on an optical network, wherein the apparatus includes a means for receiving an upstream optical signal from the first location in a first wavelength division multiplexer for transmission to the second location. A means for transmitting the upstream optical signal across a single bi-directional optical fiber to a second wavelength division multiplexer proximate the second location is provided. A means for filtering the upstream optical signal in the second wavelength division multiplexer and a means for transmitting the filtered upstream optical signal to the second location are provided.

BRIEF DESCRIPTION OF THE DRAWINGS

So that the manner in which the above recited features, advantages and objects of the present invention may be understood in detail, a more particular description of the invention briefly summarized above may be had by reference to the embodiments thereof, which are illustrated in the appended drawings. It is to be noted, however, that the appended drawings illustrate only exemplary embodiments of the invention, and are therefore, not to be considered limiting of its scope, as the invention may admit to alternative equally effective embodiments not expressly illustrated by the drawings.

DETAILED DESCRIPTION OF THE PREFERRED EMBODIMENT

Figure 2:
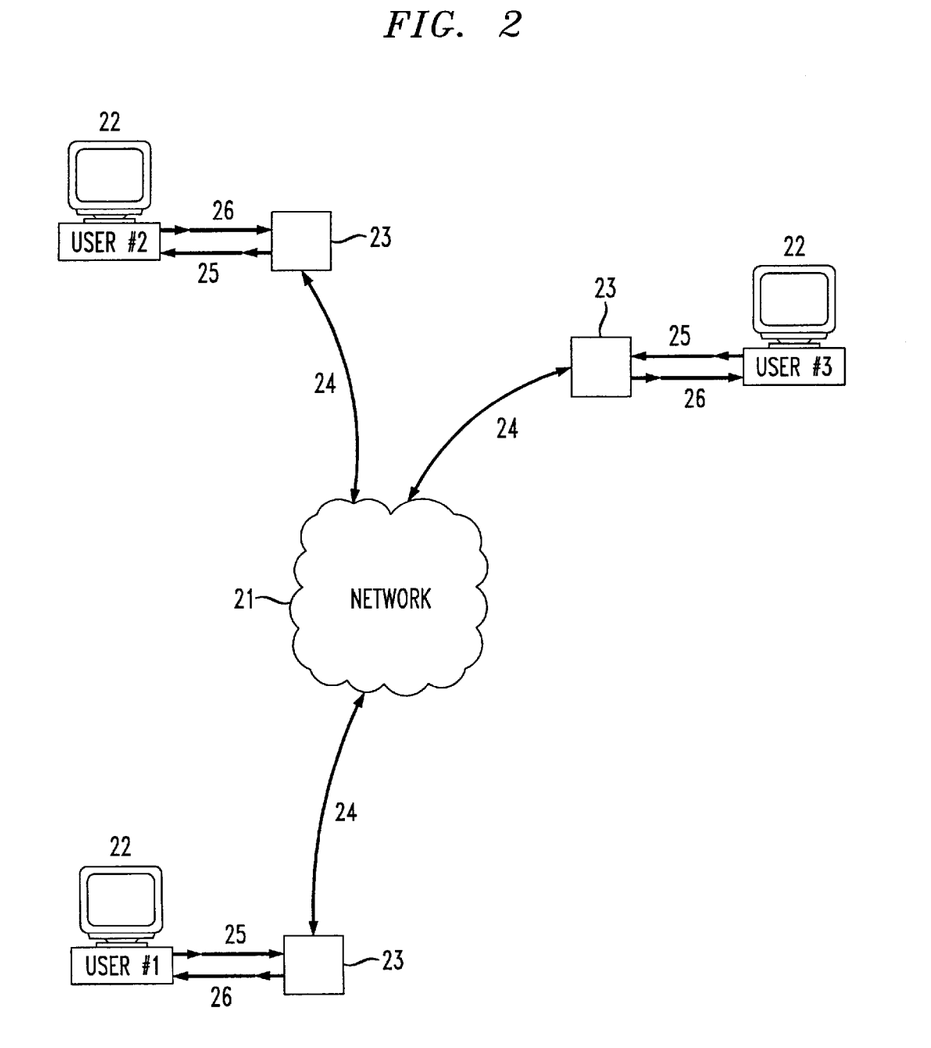
FIG. 2 illustrates an exemplary configuration of an optical network of the present invention.

In order to reduce the overhead infrastructure required by conventional dual-fiber optical networks, an embodiment of the present invention implements a multiplexer 23 proximate each end user station 22, as shown in FIG. 2. Multiplexers 23 are generally configured to combine both downstream optical signals and upstream optical signals into a single optical fiber 24 for transmission between network 21 and multiplexers 23. As such, data having a destination of a particular end user station will first travel from network 21 through single optical fiber 24 to the respective multiplexer 23 proximate the destination end user station. Multiplexers 23 further operate to separate/filter the optical signal being received from ambient optical signals within single optical fiber 24, wherein ambient signals may include any signal other than the particular optical signal to be received by the respective multiplexer. The isolated optical signal may be transmitted directly to the end user 22 from multiplexer 23 via a first optical fiber 25. In the reverse direction, an optical signal transmitted from end user 22 may be transmitted to multiplexer 23 via a second optical fiber 26. Multiplexer 23 may then guide the optical signal being transmitted into single optical fiber 24 for transmission to network 21. Therefore, single optical fiber 24 carries optical signals in both directions between network 21 and multiplexer 23, which eliminates a substantial portion of the optical fiber infrastructure used by conventional optical networks.

Figure 3:
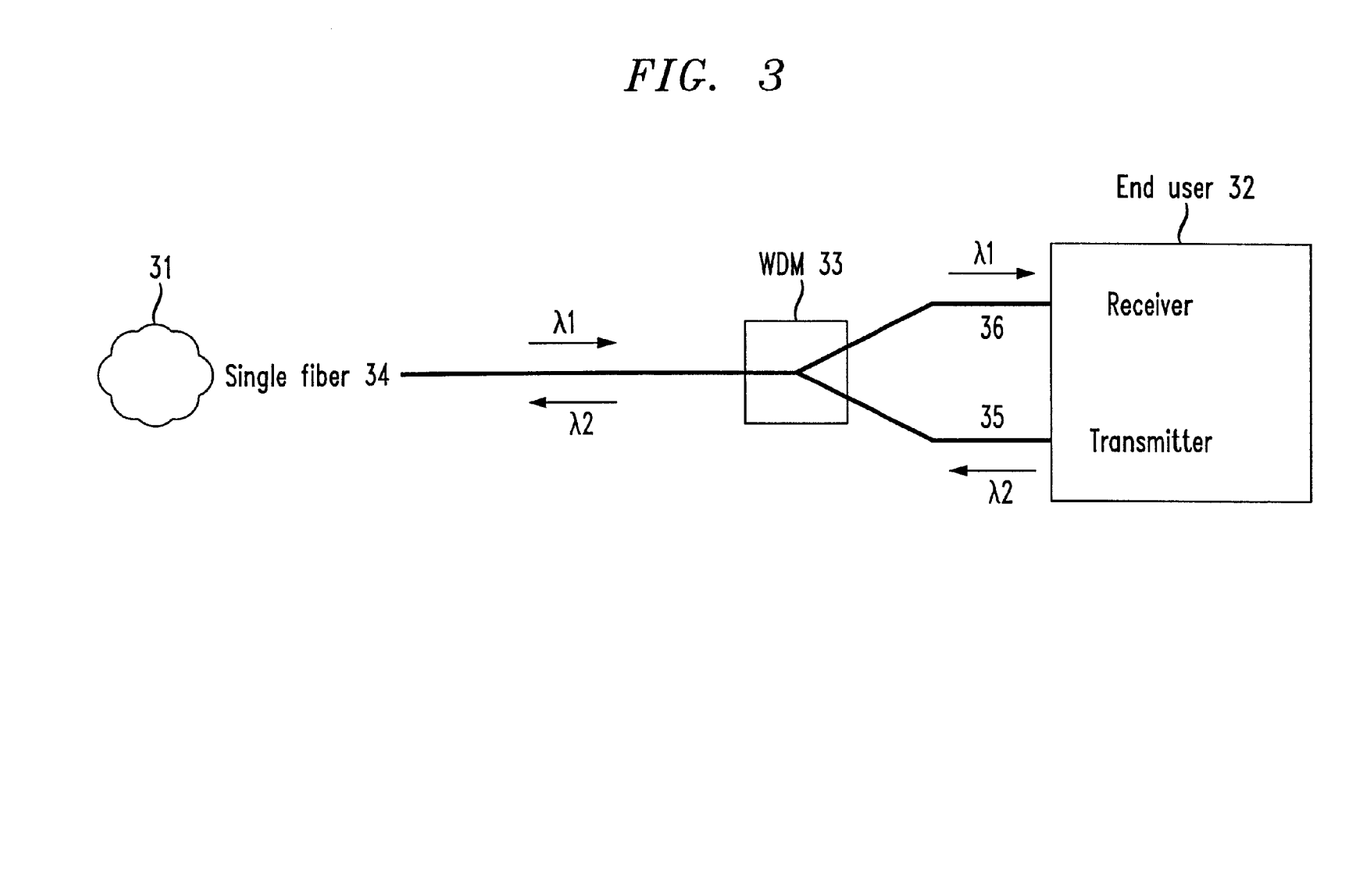
FIG. 3 illustrates an exemplary general WDM.

In a single fiber-type configuration, such as the exemplary configuration shown in FIG. 2, multiplexer 23 is generally configured to isolate optical signals according to wavelength. Therefore, multiplexer 23 may be a wavelength division-type multiplexer (WDM) 33, as shown in FIG. 3. However, the present invention is not limited to wavelength division-type multiplexers, as other multiplexer types and configurations may be implemented into the present invention without departing from the true scope thereof. For example, a frequency division or time division-type multiplexer, or other type of multiplexer may be utilized in the present invention without departing from the true scope thereof. In the embodiment shown in FIG. 2, the isolation of downstream optical signals from upstream optical signals is generally accomplished through using separate predetermined wavelengths for the upstream and downstream optical signals, which may be separated and processed by WDM 33. For example, signals traveling in the downstream direction relative to WDM 33 may share a common wavelength $\lambda_1$, while signals traveling in the upstream direction relative to WDM 33 may share a common wavelength $\lambda_2$, wherein $\lambda_1$ and $\lambda_2$ are different wavelengths. As such, single optical fiber 34 may carry optical signals having both wavelengths $\lambda_1$ and $\lambda_2$ between WDM 33 and network 31, wherein optical signals having wavelength $\lambda_1$ are traveling in the downstream direction and optical signals having wavelength $\lambda_2$ are traveling in the upstream direction in single optical fiber 34. Downstream optical signals having wavelength $\lambda_1$ traveling through WDM 33 are generally isolated from optical signals having wavelengths other than $\lambda_1$ through splitting and/or filtering operations, and then transmitted to end user 32 via a first single optical fiber 36. The splitting/filtering operation ensures that the optical signal reaching end user 32 is a clean signal. In the reverse direction, upstream optical signals originating in end user 32 having wavelength $\lambda_2$ are transmitted to WDM 33 via a second single optical fiber 35. Once the upstream optical signals are received in WDM 33, the upstream optical signals are merged into single optical fiber 34 by WDM 33 for transmission to network 31. In this configuration, the upstream optical signals having wavelength $\lambda_2$ may be simultaneously traveling through single optical fiber 34 with the downstream optical signals having wavelength $\lambda_1$, however, the upstream optical signals are traveling in the opposite direction of the downstream optical signals. More particularly, with reference to FIG. 3, the upstream optical signals would essentially be traveling through single optical fiber 34 in the direction of the arrow labeled $\lambda_2$, while the downstream optical signals may simultaneously travel through single optical fiber 34 in the opposite direction, as indicated by the arrow labeled $\lambda_1$.

In order to implement the single fiber-type optical network system generally illustrated in FIG. 2, the filtering characteristics of conventional multiplexers must be substantially improved. In particular, conventional wavelength division multiplexers manufactured using fused fiber technology suffer from a foundational disadvantage, as conventional wavelength division multiplexers generally offer optical isolation of only 20 dB, which is insufficient to support the desired minimum 45 dB isolation for a single fiber-type network system. Additionally, conventional wavelength division multiplexers manufactured using fused fiber technology are large and bulky in size, expensive, and cannot be modified and/or expanded after manufacture. In particular, current wavelength division multiplexers are often over 15 cm in length, 10 cm in width, and 1 cm in height, and are priced in the $300 to $600 range. A wavelength division multiplexer offering isolation of at least 45 dB, and preferably a smaller and much less expensive package, is preferable to support a single optical fiber network system of the present invention.

Figure 4:
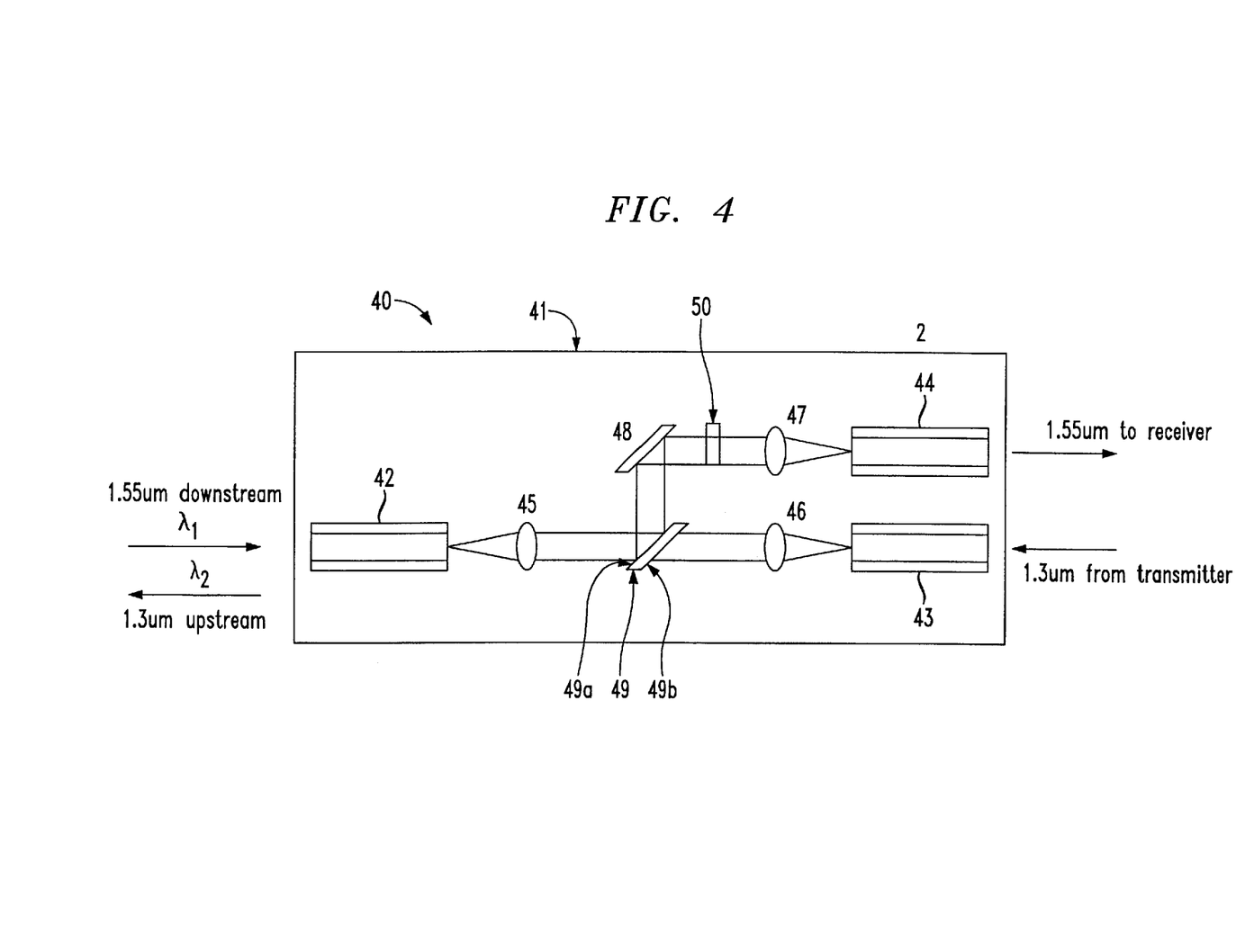
FIG. 4 illustrates an exemplary detailed WDM

A detailed illustration of an exemplary WDM 40 of the present invention is shown in FIG. 4. WDM 40 may be manufactured using micro-optical techniques, which results in an inexpensive ($30 to $40) and compact (3 cm×1.5 cm×1 cm) device capable of exceeding the isolation requirements of single fiber systems. The internal components of WDM 40 are generally contained within an outer casing 41. Although outer casing 41 is generally sealed for operation, casing 41 may be configured to be opened after manufacture in order to adjust, tune, and/or add internal components to WDM 40. Optical signals may be received by the internal components of WDM 40 through reception sleeves 42, 43, and 44 configured to connect to various external optical signal transmission mediums. Sleeves 42, 43, and 44, therefore, operate to transmit optical signals through sealed outer casing 41 to the appropriate internal components of WDM 40.

In particular, WDM 40 may include a first sleeve 42 for receiving a connector ferrule of a terminating end of an optical fiber. First sleeve 42, which may be sized for various types and configurations of connectors, such as LC, FC, SC, or ST, may be manufactured from zirconia in order to obtain optimum optical properties. In particular, sleeve 42 may be manufactured such that the interior of sleeve 42 operates to optically conduct signals therethrough. First sleeve 42 is generally configured to transmit downstream optical signals received from an external optical fiber to specific internal components of WDM 40 without leaking optical signals back into the originating optical fiber. Alternatively, first sleeve 42 is also configured to transmit upstream optical signals received from internal components of WDM 40 into the external optical fiber in communication with first sleeve 42 without leaking optical signals back into WDM 40. Therefore, first sleeve 42 is generally configured to transmit optical signals in a bi-directional manner between the internal components of WDM 40 and an external optical signal transmission medium attached thereto. Further, the optical properties of first sleeve 42 may be configured to transmit optical signals with minimal insertion loss and/or optical signal distortion.

The internal component receiving the downstream optical signal from first sleeve 42 in the exemplary embodiment shown in FIG. 4 is a first collimating lens 45. First collimating lens 45 is generally positioned within working distance of first sleeve 42, wherein the working distance is generally defined as the linear distance within which an optical component must be from an optical signal source in order to effectively capture the optical signal prior to dispersion. First collimating lens 45 may be a spherical ball type lens, an aspherical-type lens, a graded-index lens, or other bi-directional collimating-type lens known in the art as having the ability to align and/or linearly channel optical signals into a predetermined signal path. In the embodiment illustrated in FIG. 4, first collimating lens 45 is generally configured to collimate downstream optical signals received from first sleeve 42 toward a first side 49a of a first dichroic splitter 49. First splitter 49 may be manufactured from a relatively thin transparent plate, which may be glass, having a coating of a specific thin film multilayer on each side of the plate. Each of the multilayer films coating the sides of first splitter 49 are generally calculated to filter specific wavelengths of light. In the exemplary embodiment illustrated in FIG. 4, a first side 49a of first splitter 49 would generally be coated with a multilayer film calculated to reflect optical signals having the wavelength $\lambda_1$, while allowing optical signals having other wavelengths such as $\lambda_2$, to pass through splitter 49. Alternatively, first side 49a may be configured to simply reflect all wavelengths of light to the next component. Second side 49b of splitter 49 would generally be coated with a multilayer film calculated to transmit optical signals having the wavelength $\lambda_2$ through first splitter 49, and possibly reflect optical signals having the wavelength $\lambda_1$ or other wavelengths. Although the multilayer films on first side 49a and second side 49b are generally different films, a single film may be used if the single film satisfies the required optical properties for transmission and reflection of $\lambda_1$ and $\lambda_2$ In view of the optical filtering and/or splitting properties of the thin film deposited on first side 49a of first splitter 49, the optical signal reflected from first splitter 49 generally represents the downstream optical signal having wavelength $\lambda_1$. This reflected optical signal may be received by a second dichroic splitter 48, as shown in FIG. 4. In similar fashion to first splitter 49, second splitter 48 may be coated with a thin film calculated to reflect optical signals having wavelength $\lambda_1$ and transmit optical signals having other wavelengths therethrough. Therefore, the downstream optical signal having wavelength $\lambda_1$ may be reflected by second splitter 48 to the next optical component in WDM 40, while optical signals having other wavelengths are simply transmitted through second splitter 48 and dispersed in a filtering operation. As such, second splitter 48 essentially operates to both reflect the appropriate optical signals to the next component in WDM 40 while simultaneously filtering optical signals not intended to be transmitted to the next element of WDM 40. However, if the filtering characteristics of WDM 40 are sufficient, then second splitter 48 may be replaced with a purely reflective device not configured to filter optical signals of alternative wavelengths.

The downstream optical signal reflected by second splitter 48 may be received by a second collimating lens 47, which may be similar in construction to first collimating lens 45 discussed above. Second collimating lens 47 may be configured to collimate the downstream optical signal received from splitter 48 toward a second sleeve 44. Second sleeve 44, which may be similar in construction to first sleeve 42, may include a ferrule for connection to an external device or optical signal transmission medium. In particular, second sleeve 44 may include a ferrule configured to connect directly with an optical port of an end user transceiver. Alternatively, the ferrule of second sleeve 44 may be configured to connect with an optical patchcord that is in optical communication with the end user transceiver. Regardless of the specific configuration, second sleeve is configured to receive the downstream optical signal from collimating lens 47 and transmit the downstream optimal signal through to the selected transmission medium with minimal leakage of the downstream signal back into WDM 40.

Although both first and second splitters 48 and 49 cooperatively operate as filtering devices and may provide isolation of approximately 50 dB, additional filtering may be desired and/or necessary. Since optical signals traveling through a shared optical transmission medium, such as the single optical fiber of the present invention, may not emerge from the shared transmission medium undistorted from their original form, various applications may require isolation characteristics greater than the 50 dB provided by splitters 48 and 49. Therefore, the downstream optical path through WDM 40, which is the optical path generally described above, may include transmission of the downstream optical signal through an additional filtering element. In particular, a dichroic filter 50 may be placed in the downstream optical signal path within casing 41 in order to further filter any unwanted optical signals from the optical signal being sent to the end user. In similar fashion to splitters 48 and 49, filter 50 may include a transparent plate having a multilayer film deposited on at least one surface of the plate, wherein the multiplayer film is selected to filter specific wavelengths of optical signals. Further, the optical film deposited on filter 50 may be selected as a film having optical properties that are more restrictive than the films deposited on first and second splitters 48 and 49. As such, the cooperative filtering operation of first splitter 49, second splitter 48, and filter 50 may be a funneling type of filtering operation, wherein each consecutive filter becomes more restrictive to unwanted optical signals. This type of filtering configuration may generate isolation characteristics of approximately 75 dB or more, as filter 50 may add at least 25 dB of filtering capacity to splitters 48 and 49. Further, although filter 50 is illustrated as being positioned between second splitter 48 and second collimating lens 47, filter 50 may be positioned at other locations in the downstream signal path, such as, for example, between first splitter 49 and second splitter 48. Additionally, if desired, a filter similar to filter 50 may be positioned in the upstream optical signal path. In either situation, filter 50 may be placed within outer casing 41 in the appropriate filtering configuration, either during manufacture or as an expansion of the isolation characteristics of WDM 40.

The upstream optical signal path through WDM 40, which represents the signal path originating with the end user and traveling through the single optical fiber, begins with reception of the upstream optical signal by a third sleeve 43. Third sleeve 43 may be constructed in similar fashion to first and second sleeves 42 and 44 discussed above. As such, third sleeve 43 may receive the upstream optical signal from an optical patch cord or other optical signal transmission medium, directly from an end user transceiver, or from other known devices for transmitting optical signals. Upon receiving the upstream optical signal by third sleeve 43, the upstream optical signal may be directed toward the next upstream optical component of WDM 40. In the exemplary embodiment illustrated in FIG. 4, the next optical component in the upstream signal path may be a third collimating lens 46. Third collimating lens 46, which may be constructed and/or configured similarly to first and second collimating lenses 45 and 47, generally operates to channel the upstream optical signal toward the next optical component in the upstream signal path, which in the exemplary embodiment of FIG. 4, is first splitter 49.

The upstream optical signal path contacts first splitter 49 on second side 49b of first splitter 49. Therefore, the thin film deposited on second side 49b first splitter 49 will have optical properties calculated to transmit the wavelength of the upstream optical signal, while possibly reflecting other wavelengths. Alternatively, since filtering the upstream optical signal may not be necessary as a result of the signal originating proximate WDM 40, second side 49b of first splitter 49 may not have any film deposited thereon. In this configuration, the thin film deposited on first side 49a would be calculated to transmit optical signals having the upstream wavelength therethrough in the upstream direction. After the upstream optical signal leaves first splitter 49, the upstream signal contacts first collimating lens 45. First collimating lens 45, as discussed above, is configured to channel optical signals, and therefore, the upstream optical signal is channeled toward first sleeve 42. First sleeve 42 operates to communicate the upstream optical signal to the single optical fiber connected thereto via the above discussed ferrule connection, or other suitable optical connection device. After the upstream optical signal enters the single optical fiber, the operation of WDM 40 on the upstream optical signal is complete.

Figure 5:
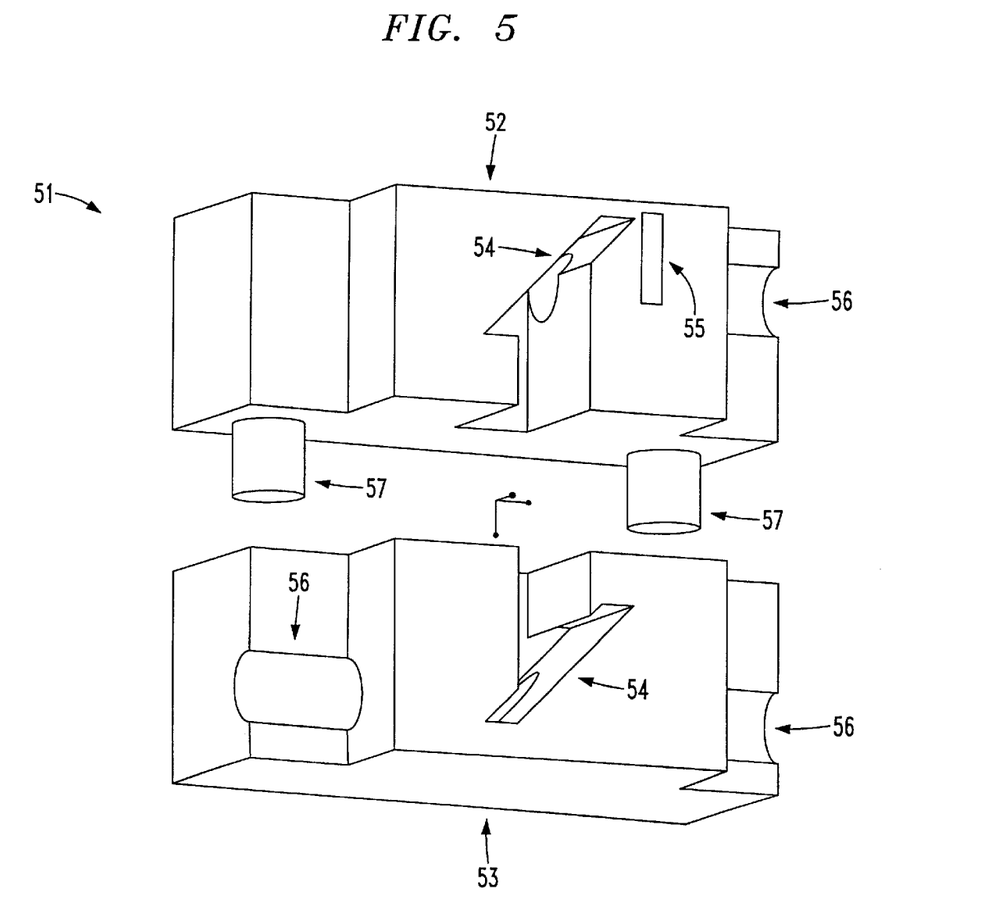
FIG. 5 illustrates a first exemplary packaging configuration of the present invention.

Aside from the optical characteristics of the internal components of the above-embodiments of a wavelength division multiplexer, the packaging of a wavelength division multiplexer of the present invention offers substantial advantages over conventional wavelength division multiplexers. In particular, a wavelength division multiplexer of the present invention offers selective filtering, improved connections, and a substantially smaller package than conventional wavelength division multiplexers. FIG. 5 illustrates a first exemplary embodiment of a packaging configuration of a WDM 51 of the present invention. FIG. 5 illustrates a split-body design, wherein the outer casing of WDM 51 is formed by joining a transmitter portion 53 to a receiver portion 52 to cooperatively form WDM 51. Transmitter portion 53 includes two bores (not shown) formed therein for cooperatively receiving each of guide posts 57 extending from receiving portion 52 upon joining the two portions together to form WDM 51. Exposed cavities 54 may receive optical elements therein, such as splitters/lenses 48 and 49 from the above noted embodiments. Filter cavity 55 may receive an additional optical filter therein if needed, such as filter 50 from the above noted embodiments.

Figure 6:
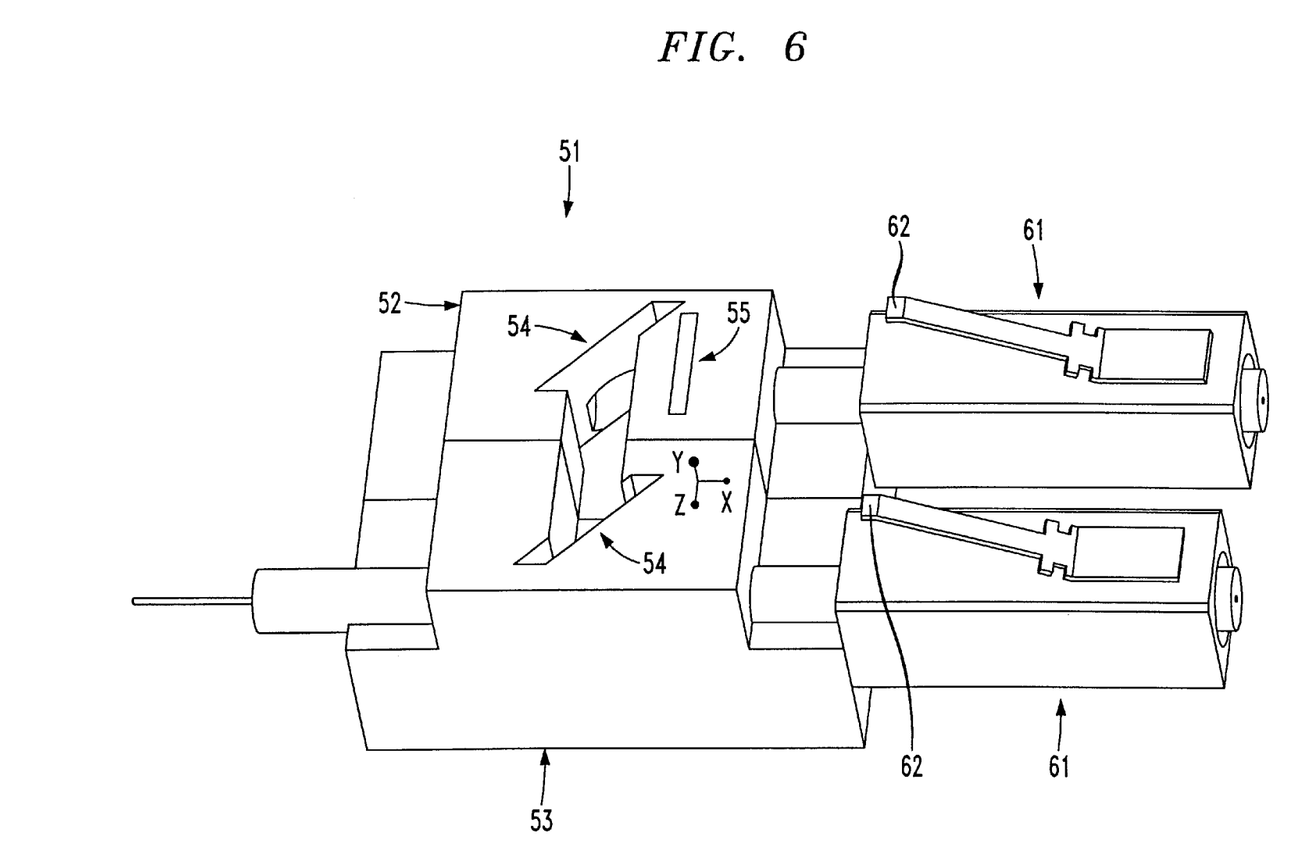
FIG. 6 illustrates a the first exemplary packaging configuration of FIG. 5 with transceiver side LC connectors attached.

WDM 51 may be configured to connect to an end user transceiver via annular apertures 56. For example, LC connectors 61, or other suitable optical connection devices, may be connected to WDM 51 via annular apertures 56, as shown in FIG. 6. The LC connectors 61 shown in FIG. 6 may include a ferrule corresponding to the diameter of annular aperture 56 in their backend. These ferrules generally have a short length of fiber inside, wherein the ends of the fiber are polished for efficient optical transmission loss characteristics. In connecting to WDM 51, the ferrule of the LC connector 61 is inserted into annular aperture 56, terminating at the working distance from the first collimating lens 45 in WDM 51 as a result of a step or narrowing diameter in annular aperture 56. The working distance, as is know in the art, is generally defined as the distance that an optical emission source may be positioned from an optical receiving device, wherein the working distance is calculated to optimize the reception of the optical signal with minimal dispersion and/or loss of the optical signal. Since the ferrule diameter and the annular aperture 56 diameter are closely matched, the center of the ferrule is generally centered on a reception lens (not shown) in WDM 51 such as the collimating lens described above with respect to FIG. 4. After insertion of ferrule into annular aperture 56 and alignment is determined to be proper, then the ferrule may be affixed to the body of WDM 51 via known means, and therefore, rigidly affixed to the end of the ferrule in proper optical alignment with the reception optical component within WDM 51. Alternatively, a lens or other optical device may be affixed into the end of the optical transmission medium being attached to WDM 51, thus potentially eliminating at least one optical reception element from within WDM 51.

Further, as a result of the two-piece construction of WDM 51 shown in FIG. 6, upon plugging into a transceiver, the LC connectors 61 may be able to slightly move in a lateral direction in order to locate and align with the transceiver sleeves. However, the two-piece design with guide posts offers minimal lateral float, which in turn allows for only minimal transverse movement of one half relative to the other. Therefore, the tolerances accommodate slight movement, which is required for alignment, but not for movement sufficient to adversely affect the operation of WDM 51. Further contributing to the alignment process is a leaf spring 62 positioned within LC connector 61 that may operate to bias an optical connection to a desired position for optimal operation. A leaf spring (not shown) within connector 61 may be manufactured integral with a floor of the housing enclosure for movement in the vertical direction (i.e., the "X" direction in the drawing). This may allow the body of WDM 51 to move vertically and assist in the alignment of transceiver sleeves (not shown) within the LC connector 61.

Figure 7:
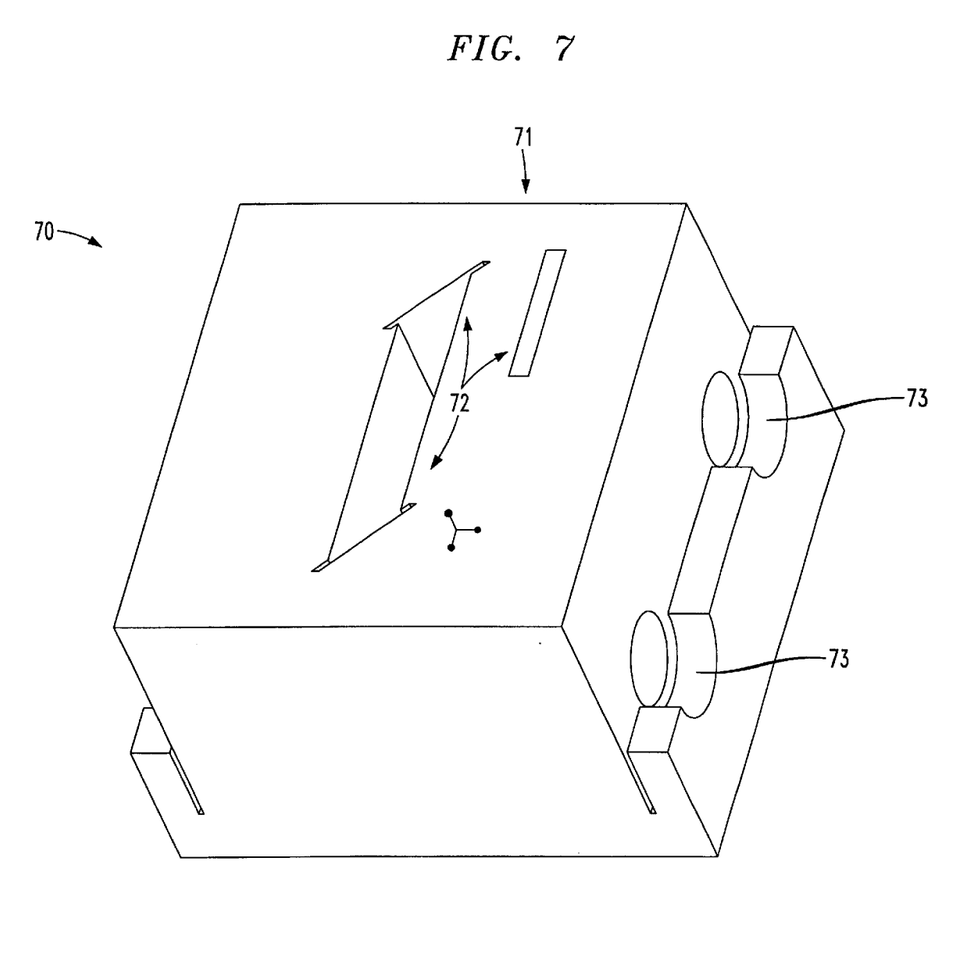
FIG. 7 illustrates a second exemplary packaging configuration of the present invention.
Figure 8:
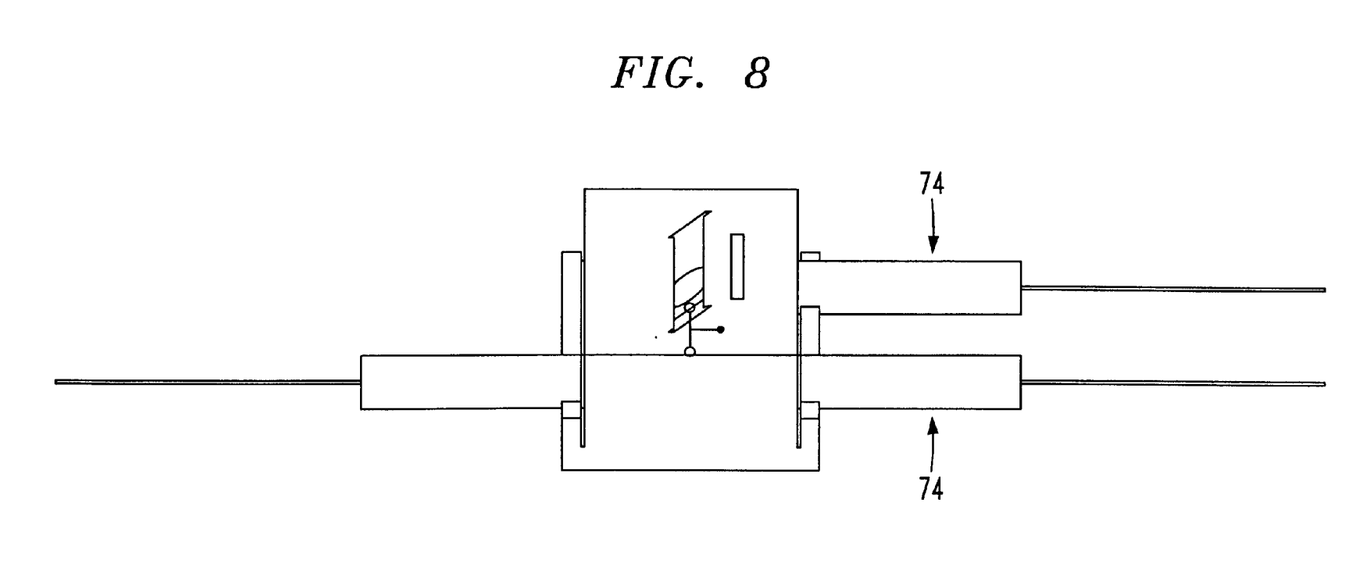
FIG. 8 illustrates the second exemplary embodiment of FIG. 7 with flexible optical pigtails attached thereto.

Another packaging configuration of the present invention is illustrated in FIG. 7. The body 71 of WDM 70 shown in FIG. 7 is of an integral construction. Therefore, there is no float or adjustment between a transmitting side of WDM 70 and a receiving side of WDM 70. Apertures 72 are provided for inserting filters, lenses, and/or splitters. Annular bores 73 extend into the interior of WDM 71, thus providing an optical path for optical signals. Connection to WDM 71 is illustrated in FIG. 8, where two flexible optical pigtail connections 74 may be inserted and affixed in bores 73. Optical pigtail connections 74 may be manufactured with a short SC ferrule on the backend, which allows for alignment of the pigtail fiber with the first optical component within WDM 71. The opposite ends of pigtails 74 may be configured to connect with a transceiver. The primary advantage of the configuration shown in FIGS. 7 and 8 is that flexible pigtails 74 allow for flexibility in connecting WDM 71 to other optical components. Furthermore, pigtails may be configured with various ends, which allows for connection to a variety of optical devices. The combination of these characteristics makes the present embodiment extremely flexible in implementation.

Figure 9:
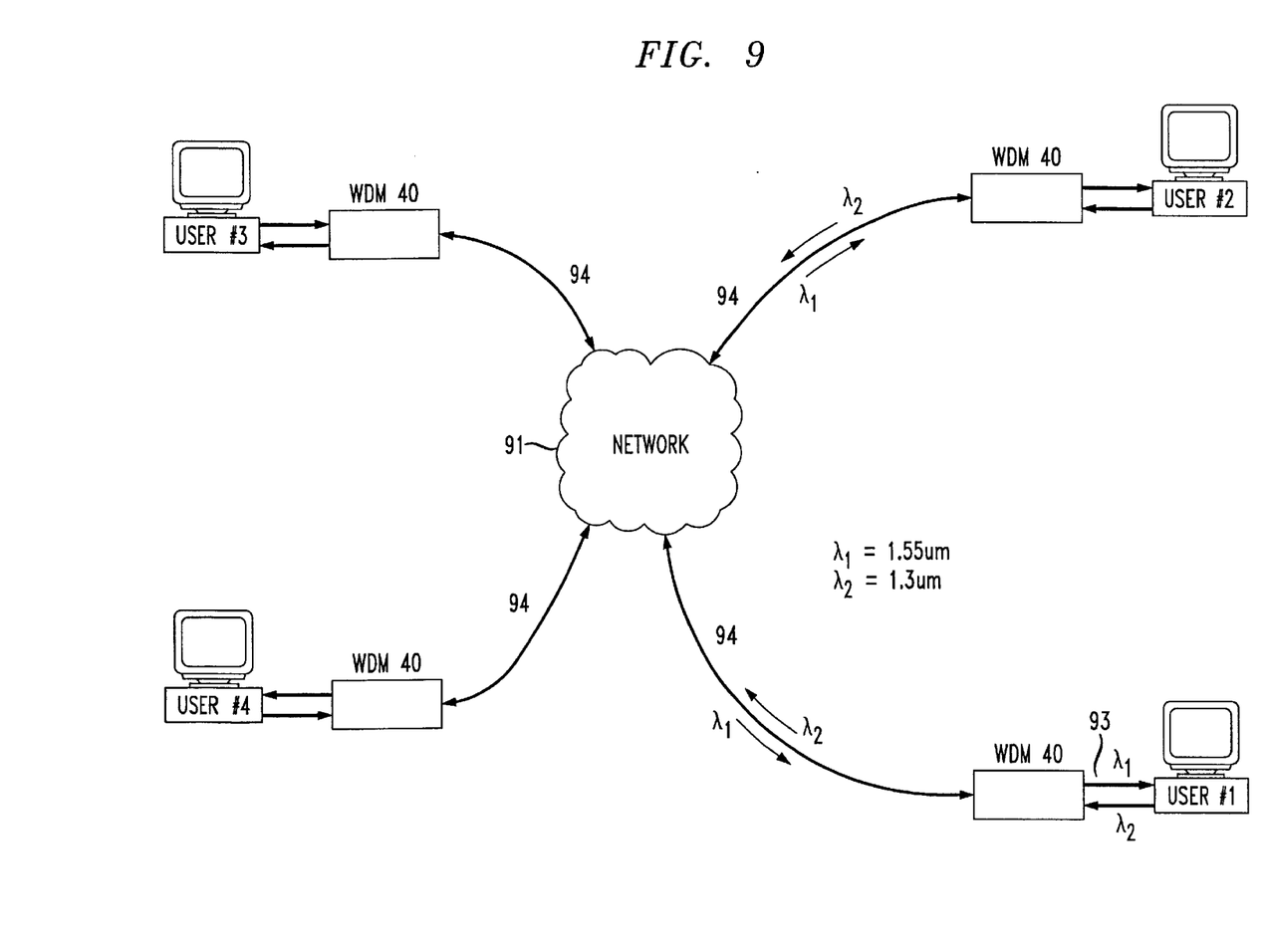
FIG. 9 illustrates an exemplary embodiment of the present invention in operation.

In order to illustrate the operation of the present invention, FIG. 9 is presented as an illustration of an exemplary embodiment of the present invention in operation. In this embodiment, it is assumed that USER 1 is sending information to USER 2 and USER 4, and simultaneously, USER 3 is sending information to USER 1. For ease in description, the process of USER 1 sending information to USERS 2 and 4 will be described first. Additionally, although various multiplexers may be implemented in the exemplary embodiment, the multiplexer used in the exemplary embodiment of FIG. 9 may be WDM 40 from FIG. 4. As such, all optical signals traveling in a downstream direction relative to their respective WDM share a common wavelength $\lambda_1$, and all optical signals traveling in the upstream direction relative to their respective WDM share a common wavelength $\lambda_2$.

In order for USER 1 to send information to USERS 2 and 4, the information is first converted to an optical signal by a processing device local to USER 1. The optical signal may be, for example, a 1.3 um wavelength signal. This optical signal may then be transmitted to WDM 40 via an optical transmission medium 93. Medium 93 may be a patchcord, a length of optical fiber, or a direct optical connection between WDM 40 and a transmitting device local to USER 1. The optical signal from USER 1 is received by WDM 40 in third sleeve 43. Third sleeve 43 transmits the optical signal to third collimating lens 46, which channels the optical signal toward first splitter 49. The optical signal contacts first splitter 49 on second side 49b and is transmitted therethrough, as the coating on both first side 49a and second side 49b of first splitter 49 allows for transmission of optical signals in the upstream direction having wavelength 1.3 um. As such, the 1.3 um optical signal propagates through splitter 49 and contacts first collimating lens 45. First collimating lens channels the 1.3 um signal into first sleeve 42, which conducts the 1.3 um signal into the single optical fiber 94 with minimal back flow into WDM 40.

Single optical fiber 94 conducts the upstream optical signal through network 91, wherein the signal is split and directed toward both USER 2 and USER 4 on the respective single optical fiber 94 leading to these end users. Alternatively, both USERS 2 and 4 may be connected to the same single optical fiber 94. In this configuration, USERS 2 and 4 may be configured to simply copy the optical signal 3 from fiber 94, leaving the original optical signal on fiber 94. Regardless of the configuration used to route the respective signal to the appropriate users, network 91 also operates to convert the incoming optical signal wavelength to a second wavelength. For example, the upstream optical signal having wavelength $\lambda_2$ may be converted to an electronic signal and then converted to an optical signal having wavelength $\lambda_1$. This conversion operation may be executed by a transceiver in network 91 configured to convert wavelengths of optical signals. When the converted optical signal, which is now a downstream optical signal, reaches the WDM 40 proximate each of end USER 2 and USER 4, the optical signal is processed in a similar manner, and therefore, a single description may apply to both users. The downstream optical signal may be received in the respective WDMs 40 by first sleeve 42. First sleeve 42 transmits the optical signal to first collimating lens 45, which channels the optical signal toward first dichroic splitter 49. First side 49a of splitter 49 includes a thin film that is calculated to reflect the wavelength of the optical signal being received by WDM 40. As such, the optical signal may be reflected toward second splitter 48, which again may include a thin film designed to reflect the wavelength of the optical signal. The downstream optical signal then passes through filter 50, which further filters the optical signal to remove any remaining optical signals not representative of the original signal transmitted by USER 1. Thereafter, the optical signal may be transmitted to second collimating lens 47, which channels the downstream optical signal second sleeve 44. Second sleeve 44 transmits the optical signal to an optical medium that is in communication with the respective end user.

Therefore, the optical signal transmitted by USER 1 has been received by both USER 2 and USER 4. The combination of splitters 48 and 49 in conjunction with filter 50 operates to remove essentially all of the ambient optical signals not corresponding directly to the wavelength of the original optical signal transmitted by USER 1.

Simultaneously with the transmission from USER 1 to USERS 2 and 4, USER 3 transmits an optical signal to USER 1. The signal may be generated and transmitted by USER 3 in the same manner described with regard to USER 1 above. The signal is transmitted through single optical fiber 94 from WDM 40 proximate USER 3 through network 91, including the wavelength conversion step, and then to the WDM 40 proximate USER 1. In the transmission process, the optical signal transmitted by USER 3 may simultaneously be traveling through single optical fiber 94 with the above described optical signal being transmitted by USER 1. As such, the respective optical signals may very well pass each other within single optical fiber 94. As such, the receiving of the optical signal transmitted by user 3 to USER 1 over the single optical fiber 94 generally requires signal isolation characteristics of at least 45 dB from WDM 40, as the signal entering WDM 40 may contain additional optical signals that feed back into the WDM 40. Therefore, upon receiving the optical signal in WDM 40 proximate USER 1, the signal is filtered by first and second dichroic splitters 49 and 48 and by filter 50, which cooperatively provide isolation of approximately 75 dB. As such, any unwanted optical signals entering W7DM 40 may be filtered prior to being transmitted to USER 1.

Figure 10:
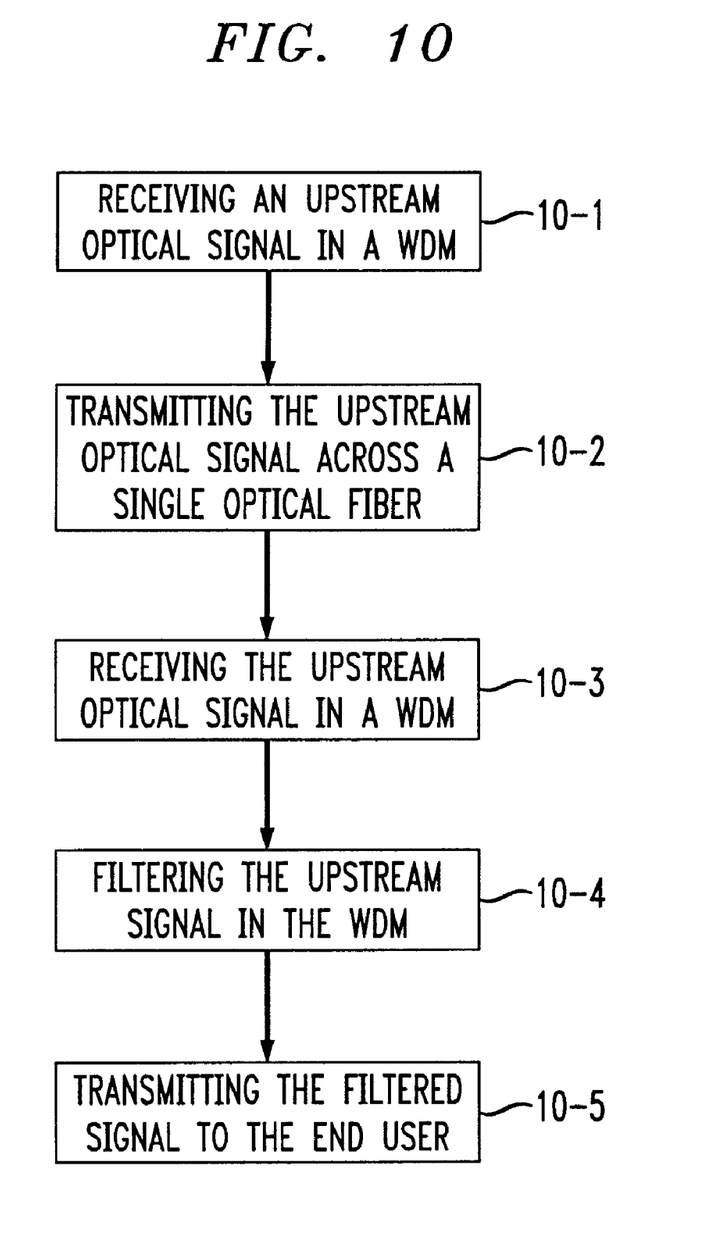
FIG. 10 illustrates an exemplary method of the present invention.

A flowchart of an exemplary method of the present invention is shown in FIG. 10. Assuming that optical signals are being transmitted between a first and second end users, the exemplary method may include receiving an upstream optical signal for transmission to another user in a local WDM, as shown in step 10-1. The upstream optical signal may be filtered in the WDM prior to transmission of the upstream optical signal to the other user via a single optical fiber at step 10-2. The transmitted optical signal, which may be converted to a different wavelength during a portion of the transmission process, may be received by a WDM local to the receiving user at step 10-3. The WDM local to the receiving user may filter the signal to remove any unwanted optical signals at step 10-4. The filtered signal may then be transmitted to the end user at step 10-5.

Simultaneously with steps 10-1 through 10-5, which generally represents the transmission of an optical signal from the first user to the second user, the second user may transmit an optical signal to the first user. The transmission steps for this process may be similar to steps 10-1 through 10-5, and therefore, the optical signal being transmitted from the second user to the first user may very well simultaneously occupy the single optical fiber with the signal traveling from first user to second user.

While foregoing is directed to the exemplary embodiments of the present invention, other additional embodiments of the present invention may be devised without departing from the true scope thereof, wherein the true scope of the present invention may be determined by reference to the metes and bounds of the following claims.

What is claimed is:

1. An apparatus for wavelength multiplexing optical signals, the apparatus comprising:
    at least one dichroic splitter positioned to receive an optical signal;
    a filter positioned to receive the optical signal from the at least one dichroic splitter,
    wherein the combination of the at least one dichroic splitter and the filter provides an optical isolation of at least 75 dB; and
    a casing for receiving optical components of the apparatus, the casing comprising:
        a first casing portion, the first casing portion having at least one first signal communication aperture formed therein, at least one first optical component insertion aperture formed therein, a first substantially hollow interior portion, and at least two guide posts extending therefrom; and
        a second casing portion, the second casing portion having at least one second signal communication aperture formed therein, at least one second optical component insertion aperture formed therein, a second substantially hollow interior portion, and wherein the at least two guide bores formed therein,
    wherein at least two guide posts are configured to engage the at least two guide bores to cooperatively form a unitary casing.

2. The apparatus of claim 1, wherein the at least one dichroic splitter further comprises a transparent member having a first and second substantially planar sides, at least one of the first and second sides having a thin film deposited thereon, wherein the thin film is calculated to reflect predetermined wavelengths of optical signals.

3. The apparatus of claim 1, wherein the filter further comprises a transparent member having a first and second substantially planar sides, at least one of the first and second sides having film for filtering optical signals deposited thereon.

4. The apparatus of claim 3, wherein the film is configured to provide at least 25 dB of isolation.

5. The apparatus of claim 1, wherein the at least one dichroic splitter provides at least 50 dB of isolation.

6. The apparatus of claim 1, wherein the at least one dichroic splitter further comprises:
    a first dichroic splitter; and
    a second dichroic splitter in optical communication with the first dichroic splitter, wherein the combination of the first and second splitter provides optical isolation of at least 50 dB.

7. The apparatus of claim 1, further comprising:
    at least one optically conductive sleeve; and
    at least one collimating lens positioned to receive the optical signal from the at least one optically conductive sleeve.

8. A wavelength division multiplexer comprising:
    a first optically conductive sleeve;
    a first collimating lens positioned at a working distance from the first optically conductive sleeve, the first collimating lens being configured to collimate a downstream optical signal into a first signal path;
    a first dichroic splitter positioned in the first signal path, the first dichroic splitter being configured to reflect the downstream optical signal having a first wavelength into a second signal path with a first side of the first dichroic splitter;
    a second dichroic splitter positioned in the second signal path, the second dichroic splitter being configured to reflect the downstream optical signal having the first wavelength into a third signal path;
    a filter positioned in the third signal path;
    a second collimating lens positioned in the third signal path, the second collimating lens being configured to collimate the downstream optical signal traveling in the third signal path;
    a second optically conductive sleeve positioned to receive the collimated downstream optical signal;
    a third collimating lens for transmitting an upstream optical signal to a second side of the first dichroic splitter;
    a third optically conductive sleeve for receiving the upstream optical signal from an external component and transmitting the upstream optical signal to the third collimating lens,
    wherein the combination of first dichroic splitter and second dichroic splitter provides an optical isolation of at least 50 dB; and
    a casing, wherein the casing is configured to receive optical components of the wavelength division multiplexer therein, the casing comprising:
    a first casing portion having a first hollow interior portion for receiving optical components therein, the first hollow interior portion being in communication with the exterior, and at least two guide posts extending therefrom; and
    a second casing portion having a second hollow interior portion for receiving optical components therein and at least two guide bores formed therein, the second hollow interior portion being in communication with the exterior,
    wherein the at least two guide posts are configured to engage the at least two guide bores to cooperatively form a unitary casing, such that the first hollow interior portion is in communication with the second hollow interior portion.

9. The wavelength division multiplexer of claim 8, wherein the filter further comprises a dichroic filter.

10. The wavelength division multiplexer of claim 8, wherein the filter is configured to add 25 dB of isolation to the wavelength division multiplexer.

11. The wavelength division multiplexer of claim 8, further comprising at least one aperture for receiving and communicating an optical component to an interior portion of the wavelength division multiplexer.

12. The wavelength division multiplexer of claim 8, wherein the casing is further configured to receive at least one optical connector in at least one annular aperture formed in an exterior of the casing.

13. The wavelength division multiplexer of claim 12, wherein the at least one optical connector further comprises an LC connector.

* * * * *